United States Patent
Zhao et al.

(10) Patent No.: US 7,826,558 B2
(45) Date of Patent: Nov. 2, 2010

(54) TRANSMISSION SYSTEM, TRANSMISSION METHOD, RECEPTION SYSTEM, AND RECEPTION METHOD

(75) Inventors: Zheng Zhao, Beijing (CN); Jifeng Li, Kanagawa (JP)

(73) Assignee: Panasonic Corporation, Osaka (JP)

(*) Notice: Subject to any disclaimer, the term of this patent is extended or adjusted under 35 U.S.C. 154(b) by 580 days.

(21) Appl. No.: 11/909,434

(22) PCT Filed: Mar. 29, 2006

(86) PCT No.: PCT/JP2006/306541
§ 371 (c)(1),
(2), (4) Date: Sep. 21, 2007

(87) PCT Pub. No.: WO2006/106770
PCT Pub. Date: Oct. 12, 2006

(65) Prior Publication Data
US 2009/0034586 A1    Feb. 5, 2009

(30) Foreign Application Priority Data
Mar. 30, 2005   (CN) .................... 2005 1 0062912

(51) Int. Cl.
*H04B 1/707* (2006.01)
(52) U.S. Cl. .................. 375/299; 375/267; 375/146
(58) Field of Classification Search .................. 375/267, 375/346, 295, 299, 146; 455/101; 370/208
See application file for complete search history.

(56) References Cited

U.S. PATENT DOCUMENTS
6,594,473 B1 * 7/2003 Dabak et al. ................. 455/101
(Continued)

FOREIGN PATENT DOCUMENTS
JP            2003347979         12/2003
(Continued)

OTHER PUBLICATIONS
Multi-Paths Diversity for MIMO (MPD), R1-030760, TSG-RAN Working Group1 meeting #33, Nortel Networks, Aug. 25-29, 2003.*
(Continued)

*Primary Examiner*—Chieh M Fan
*Assistant Examiner*—Aristocratis Fotakis
(74) *Attorney, Agent, or Firm*—Dickinson Wright PLLC

(57) ABSTRACT

First normalizing means (12) normalizes first and second code streams ($s_1$, $s_2$). First spreading means (13) spreads the output of the first normalizing means (12). STTD coding means (14) subjects the first and second code streams ($s_1$, $s_2$) to STTD coding. Second normalizing means (15) normalizes the output of the STTD coding means (14). Second spreading means (16) spreads the output of the second normalizing means (15) by means of the same spreading code as that of the first normalizing means (12). Orthogonal transforming means (17) gives the negative signs to odd chips in a second path spread sequence of each code and exchanges the orders of the odd and even chips. Combining means (18) adds first and second spread sequences of the second path produced by orthogonally transforming the first and second spread sequences of the first path. With this, by using the orthogonality of the transmitted sequences at the receiving side, the reception signal can be detected with a lower complexity.

16 Claims, 9 Drawing Sheets

U.S. PATENT DOCUMENTS

| | | | |
|---|---|---|---|
| 6,757,322 | B2 | 6/2004 | Schilling |
| 6,801,790 | B2 | 10/2004 | Rudrapatna |
| 2003/0067993 | A1* | 4/2003 | Viswanathan ............... 375/267 |
| 2004/0077378 | A1* | 4/2004 | Kim et al. ................ 455/562.1 |

FOREIGN PATENT DOCUMENTS

| | | | |
|---|---|---|---|
| WO | 03047032 | | 6/2003 |
| WO | WO 2007020563 | * | 2/2007 |

OTHER PUBLICATIONS

Nortel Networks, Multi-Paths Diversity for MIMO (MPD), TSG-RAN Working Group 1 meeting #33, R1-030760, Aug. 25, 2003.

T. Rappaport, et al.; "Wireless Communications: Past Events and A Future Perspective," IEEE communications magazine, May 2002, pp. 148-161.

"Multi-paths Diversity for MIMO (MPD)," TSG-RAN Working Group 1 meeting #32, Nortel, May 19-23, 2003, R1-030565, pp. 1-5.

"Further results on Multi-Path Diversity for MIMO (MPD)," TSG-RAN Working Group 1 meeting #34, Nortel, R1-031102, Oct. 6-11, 2003, pp. 1-4.

Rate Control for MPD,: TSG-RAN Working Group 1 meeting #35, Nortel, R1-031316, Nov. 17-21, 2003, pp. 1-4.

3GTS 25.221 V3.2.0, "$3^{rd}$ Generation Partnership Project; Technical Specification Group Radio Access Network; Physical channels and mapping of transport channels onto physical channels (TDD)," Mar. 2000, pp. 1-45.

* cited by examiner

TRANSMISSION SYSTEM, TRANSMISSION METHOD, RECEPTION SYSTEM, AND RECEPTION METHOD

TECHNICAL FIELD

The present invention relates to transmission and reception of space-time transmission sequences in a multi-antenna CDMA wireless communication system. More particularly, the present invention relates to a transmission system and a transmission method, and a reception system and reception method where sequences to be transmitted have orthogonality and that realize detection of received signals with a lower complexity on a receiving side.

BACKGROUND ART

A MIMO (Multiple-Input Multiple-Output) system has the highest potential for realizing high-speed transmission in 3G and 4G cellular systems, fixed wireless access system and wireless local network (Non-Patent Document 1). MIMO systems are broadly divided into two types: a spatial diversity system and a multiple access systems, and each has different characteristics and features.

In a spatial diversity system, the same data is transmitted through different antennas, and the statistics of the space fading characteristics of the antennas are independent, so that such a transmission scheme effectively suppresses space selective fading. STTD (Space-Time block coding Transmit Diversity) is one such system. STTD has a special orthogonal design and superior performance and is easy to be realized, so that STTD attracts widespread attention in the academic and industrial worlds. At present, STTD is the most studied and used space-time coding and modulation technique. This STTD technique was formally incorporated into WCDMA Proposal 3G TS 25.221 (Non-Patent Document 6) soon after the technique was first proposed. The employed coding scheme is a typical 2×2 space-time block code.

A multiple access system transmits serial-to-parallel (S/P) converted bit streams through different antennas. The multiple access system identifies different data transmitted at the same time utilizing the independency of different antenna radio channels. As a result, the system capacity can be increased. One example of a multiple access system includes a V-BLAST system.

The V-BLAST system has high capacity and has spatial diversity capability. Further, in order to identify the different data transmitted at the same time, the V-BLAST system requires the number of antennas on the receiving side equal to or larger than the number of transmitting antennas. However, as for a cellular communication system, demands for a size and portability of mobile telephones limit the number of antennas.

In order to solve this problem, Nortel proposes MPD (Multi-path Diversity) for 3GPP (Non-Patent Document 2, Non-Patent Document 3, Non-Patent Document 4 and Non-Patent Document 5). MPD has a throughput rate similar to V-BLAST, but does not require the number of receiving antennas equal to or larger than the number of transmitting antennas. In an MPD transmission system, as shown in FIG. 1, first, S/P converting section 81 performs S/P conversion on a code stream from a data source and obtains two code streams of first code stream $s_1$ and second code stream $s_2$.

Next, above first code stream $s_1$ and second code stream $s_2$ are branched, and first normalizing section 82 performs normalization processing on one of the branches. This normalization processing refers to, for example, processing such as multiplication of the codes of the first code stream and second code stream by constant $1/\sqrt{2}$ so that the power of the transmitted code becomes 1. The normalized code streams are then subjected to spreading processing by first spreading section 83. For example, a specific spread code is multiplied by the code to be spread, and a first spread sequence and a second spread sequence of the first path are outputted.

Code streams of another branch are inputted to STTD coding section 84 and subjected to the processing expressed by following equation 1.

[1]

$$\begin{pmatrix} s_1 \\ s_2 \end{pmatrix} \Rightarrow \begin{pmatrix} -s_2^* \\ s_1^* \end{pmatrix} \qquad \text{(Equation 1)}$$

Code streams $-s_2^*$ and $s_1^*$ subjected to STTD coding by STTD coding section 84 are outputted to second normalizing section 85. Second normalizing section 85 performs normalization processing such as, for example, multiplication of above code streams $-s_2^*$ and $s_1^*$ by constant $1/\sqrt{2}$.

The normalized code streams are then subjected to spreading processing by second spreading section 86. This spreading processing is processing of multiplying a specific spread code by the code streams to be spread. As a result of this processing, a first spread sequence and a second spread sequence of the second path are outputted.

Then, the first spread sequence and second spread sequence of the second path are delayed by one chip by delaying section 87. Subsequently, the delayed first spread sequence and second spread sequence of the second path are added to the spread first spread sequence and second spread sequence of the first path, respectively, by combining section 88. The sequences after the addition are transmitted through two antennas.

FIG. 2 is a block diagram showing a configuration of an MPD reception system. A signal received through the receiving antenna is inputted to despreading section 91 and subjected to despreading processing. That is, the inner product of the received signal is taken using the corresponding spreading code vector and the chip vector of a received code.

Non-Patent Document 1: T. S. Rappaport, A. Annamalai, R. M. Buehrer, and W. H. Tranter, "Wireless communications: past events and a future perspective," IEEE Commun. Mag., vol. 40, no. 5, Part: Anniversary, pp. 148-161, May 2002.

Non-Patent Document 2: Nortel, "Multi-paths diversity for MIMO (MPD)", 3GPP TSG RAN WG1, R1-030565.

Non-Patent Document 3: Nortel, "Multi-paths diversity for MIMO (MPD)", 3GPP TSG RAN WG1, NY, R1-030760.

Non-Patent Document 4: Nortel, "Further results on Multi-Paths Diversity for MIMO (MPD)", 3GPP TSG RAN WG1, NY, R1-031102.

Non-Patent Document 5: Nortel, "Rate Control for MPD", 3GPP TSG RAN WG1, NY, R1-031316.

Non-Patent Document 6: 3G TS 25.221 V3.2.0 (2000-03) [online], available from http://www.3gpp.org.

DISCLOSURE OF THE INVENTION

Problems to be Solved by the Invention

However, MPD employs chip-level delay diversity, and therefore the orthogonality of the spread code collapses. Thus, a great amount of other user interference signals remain in the spread signal, and therefore the signal to interference and noise ratio (SINR) of the despread signal decreases. Further, due to the delay influence, there is inter-symbol interference in the despread signal even in a flat fading environment. In order to reduce the interference of the despread signal, interference canceller (IC) processing needs to be performed in the MPD system.

In order to cancel interferences from other users and inter-symbol interference, the above interference canceller processing is performed by interference canceling section 92. Then, the code streams from which interference is canceled are subjected to demodulation processing based on, for example, an MMSE method in demodulating section 93. First code stream $s_1$ and second code stream $s_2$ obtained by the demodulation processing are then outputted. Next, first code stream $s_1$ and second code stream $s_2$ are P/S converted by P/S converting section 94, and the code streams used in the subsequent processing are then outputted through P/S conversion.

The above MPD method significantly increases the level of complexity on the receiving side compared to the conventional STTD method. Furthermore, flexibility of the system is limited, and the above MPD method cannot effectively reduce the various types of interference.

It is therefore an object of the present invention to provide a transmission system, transmission method, reception system and reception method that realize detection of received signals with a lower complexity by utilizing the orthogonality of the transmission sequences on the receiving side.

Means for Solving the Problem

The transmission system of the present invention employs a configuration including: a serial-to-parallel converting section that serial-to-parallel converts an inputted code stream and outputs a first code stream and a second code stream; a first spreading section that spreads the first code stream and the second code stream using a specific spread code, and outputs first and second spread sequences of a first path; a space-time transmit diversity coding section that performs space-time transmit diversity coding on the first code stream and the second code stream, and outputs the coded first code stream and second code stream; a second spreading section that spreads the first code stream and second code stream coded by using the specific spread code, and outputs first and second sequences of a second path; an orthogonal transforming section that converts odd-number-th chips of the first and second spread sequences of the second path to negative values, exchanges the order of the odd-number-th and even-number-th chips and outputs the orthogonally transformed first and second spread sequences; and a combining section that adds the first and second spread sequences of the first path to the orthogonally transformed first and second spread sequences, respectively, and transmits the addition results through antennas.

The reception system of the present invention employs a configuration including: a despreading section that despreads a signal which is transmitted from the transmission system according to claim 1 and inputted from a receiving antenna, and outputs a first code stream and a second code stream; and a space-time transmit diversity decoding section that performs space-time transmit diversity decoding on the first code stream and second code stream, and outputs the decoded code streams.

The transmission method of the present invention employs a method including: serial-to-parallel converting an inputted code stream and outputting a first code stream and a second code stream; spreading the first code stream and the second code stream using a specific spread code, and outputting first and second spread sequences of a first path; performing space-time transmit diversity coding on the first code stream and the second code stream, and outputting the coded first code stream and second code stream; spreading the first code stream and second code stream coded by using the specific spread code, and outputting first and second spread sequences of a second path; converting odd-number-th chips of the first and second spread sequences of the second path to negative values, exchanging the order of the odd-number-th and even-number-th chips and outputting the orthogonally transformed first and second spread sequences; and adding the first and second spread sequences of the first path to the orthogonally transformed first and second spread sequences of the second path, respectively, and transmitting the addition results from antennas.

The reception method of the present invention employs a method including: despreading a signal which is transmitted by the transmission method according to claim 9 and inputted through a receiving antenna, and outputting a first code stream and a second code stream; and performing space-time transmit diversity decoding on the first code stream and second code stream, and outputting the decoded code streams.

Advantageous Effect of the Invention

By employing the systems and methods of the present invention, it is possible to obtain the following advantages.

(1) In the present invention, codes are transmitted through two antennas, so that it is possible to realize spatial diversity. Further, the system enables transmission of the content of two codes at the same time in one code period, so that it is possible to realize multiple access and improve transmission efficiency.

(2) The system is different from the conventional multiple access system, and the content of codes transmitted in one code period can be obtained at a single receiving antenna using a corresponding detection algorithm.

(3) Although there is no inter-symbol interference or interference between users in the despread signal, and it is not necessary to cancel interference, the signal still has STTD orthogonal characteristics.

BEST MODE FOR CARRYING OUT THE INVENTION

An embodiment of the present invention will now be described in detail with reference to the accompanying drawings. In this embodiment, the operation principle of the present invention will be first described using a system having two transmitting antennas as an example, and then is applied to conditions where the number of transmitting antennas is increased. Although the number of receiving antennas is not limited in the present invention, in order to simplify description, an example of one receiving antenna will be described in this embodiment.

Figure 3:
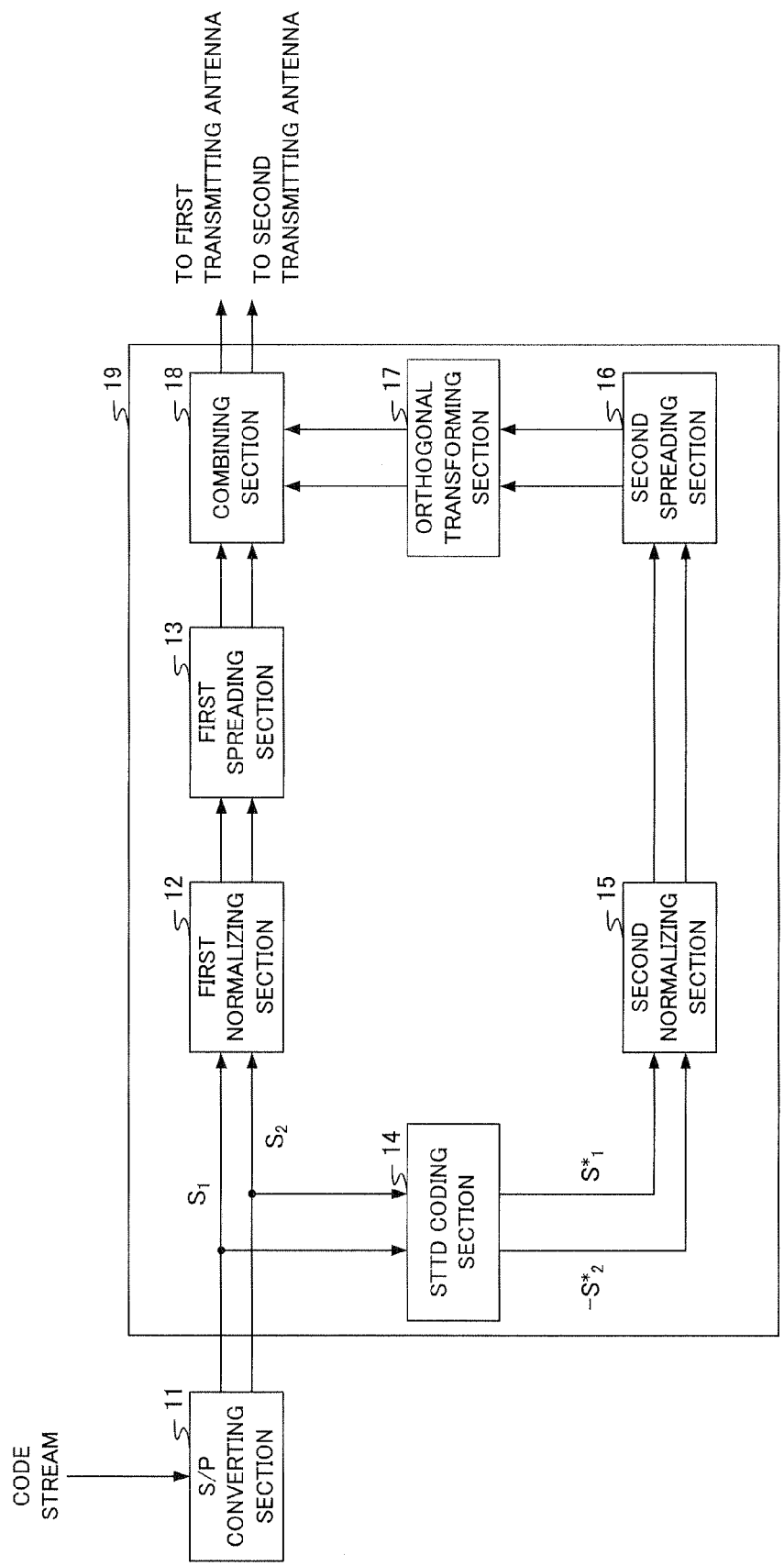
FIG. 3 is a block diagram showing a transmission system according to an embodiment of the present invention.

FIG. 3 shows a configuration of a transmission system according to an embodiment of the present invention where two transmitting antennas are used.

As shown in FIG. 3, first, S/P converting section 11 performs S/P conversion on an inputted code stream, and then outputs first code stream $s_1$ and second code stream $s_2$, which are parallel signals.

Here, STTD spreading section 19 performs two types of spreading processing on above first code stream $s_1$ and second code stream $s_2$. Meanwhile, first normalizing section 12 performs normalization processing such as multiplication of the codes of first code stream $s_1$ and second code stream code $s_2$ by constant $1/\sqrt{2}$ so that the power of the transmitted code becomes 1, for example.

Next, first spreading section 13 spreads the output of first normalizing section 12. For example, first spreading section 13 obtains output codes $s_{2n-1}$ and $s_{2n}$ subjected to S/P conversion and normalization in the n-th code period, and spreads the output codes using the same spread code. As a result, the spread sequences (2) of the first path of the two codes indicated below are obtained.

[2]

$$s_{2n-1}c_1, s_{2n-1}c_2, \ldots, s_{2n-1}c_N$$

$$s_{2n}c_1, s_{2n}c_2, \ldots, s_{2n}c_N \quad \text{(Equation 2)}$$

On the other hand, STTD coding section 14 performs STTD coding on first code stream $s_1$ and second code stream $s_2$. For example, STTD coding section 14 performs STTD coding on $s_{2n-1}$ and $s_{2n}$ in the n-th code period and obtains outputs $s_{2n-1}{}^*$ and $-s_{2n}{}^*$. That is, the processing expressed by following equation 3 is performed.

[3]

$$\begin{pmatrix} s_{2n-1} \\ s_{2n} \end{pmatrix} \Rightarrow \begin{pmatrix} -s_{2n}^* \\ s_{2n-1}^* \end{pmatrix} \quad \text{(Equation 3)}$$

Next, second normalizing section 15 performs normalization processing, and second spreading section 16 spreads the two output codes using the same spread code as in first normalizing section 12. As a result, the spread sequences (4) of the second path of the two codes indicated below are obtained.

[4]

$$-s_{2n}{}^*c_1, -s_{2n}{}^*c_2, \ldots, -s_{2n}{}^*c_N$$

$$s_{2n-1}{}^*c_1, s_{2n-1}{}^*c_2, \ldots, s_{2n-1}{}^*c_N \quad \text{(Equation 4)}$$

In order to calculate the solution of the two codes of $s_{2n-1}$ and $s_{2n}$ from the despread signal on the condition of a single receiving antenna, orthogonal transforming section 17 converts the odd-number-th chips in the second path spread sequence of each code to negative values and obtains following spread sequence (5).

[5]

$$s_{2n}{}^*c_1, -s_{2n}{}^*c_2, \ldots s_{2n}{}^*c_{N-1}, -s_{2n}c_N$$

$$-s_{2n-1}{}^*c_1, s_{2n-1}{}^*c_2, \ldots, -s_{2n-1}{}^*c_{N-1}, s_{2n-1}{}^*c_N \quad \text{(Equation 5)}$$

Then, the orthogonal transforming section 17 exchanges the order of the odd-number-th and even-number-th chips and obtains following spread sequence (6).

[6]

$$-s_{2n}{}^*c_2, s_{2n}{}^*c_1, \ldots, -s_{2n}{}^*c_N, s_{2n}{}^*c_{N-1}$$

$$s_{2n-1}{}^*c_2, -s_{2n-1}{}^*c_1, \ldots, s_{2n-1}{}^*c_N, -s_{2n-1}{}^*c_{N-1} \quad \text{(Equation 6)}$$

Next, combining section 18 adds the first spread sequence and second spread sequence of the first path to the orthogonally transformed first spread sequence and second spread sequence of the second path, respectively, and sends out the sequences after the addition through a first transmitting antenna and a second transmitting antenna. For example, the signal transmitted in the n-th code period through the first transmitting antenna is the spread sequence (7) shown below. Further, the signal transmitted through the second transmitting antenna is the spread sequence (8) shown below.

[7]

$$-s_{2n}{}^*c_2 + s_{2n-1}c_1, s_{2n}{}^*c_1 + s_{2n-1}c_2, \ldots, -s_{2n}{}^*c_N + s_{2n-1}c_{N-1}, s_{2n}{}^*c_{N-1} + s_{2n-1}c_N \quad \text{(Equation 7)}$$

[8]

$$s_{2n-1}{}^*c_2 + s_{2n}c_1, -s_{2n-1}{}^*c_1 + s_{2n}c_2c_2, \ldots, s_{2n-1}{}^*c_N + s_{2n}c_{N-1}, -s_{2n-1}{}^*c_{N-1} + s_{2n}c_N \quad \text{(Equation 8)}$$

As described above, in the present invention, first normalizing section 12 and second normalizing section 15 may be configured using a multiplier, and the combining section of the present invention may be configured using an adder.

Figure 1:
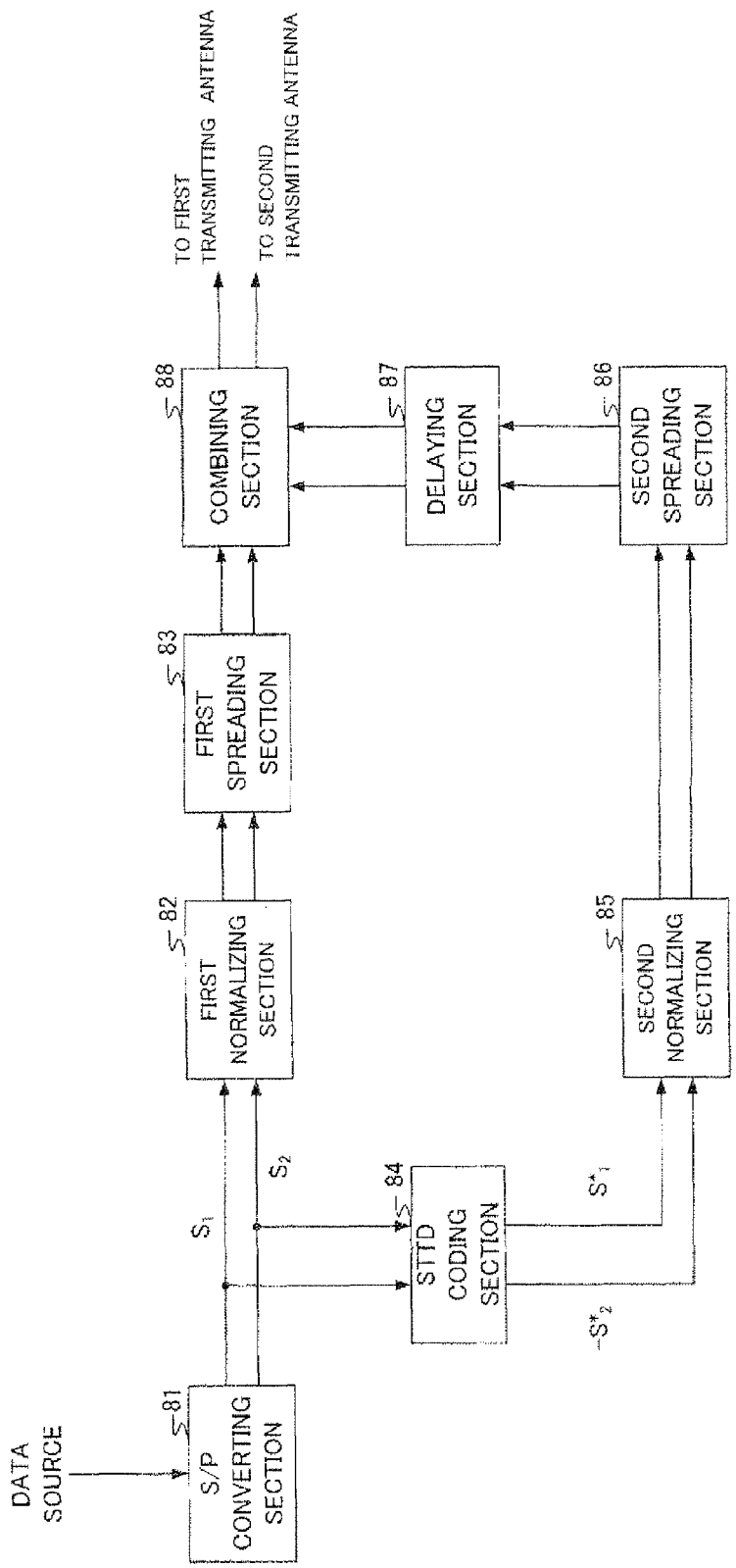
FIG. 1 is a block diagram showing a configuration of a conventional MPD transmission system.
Figure 2:
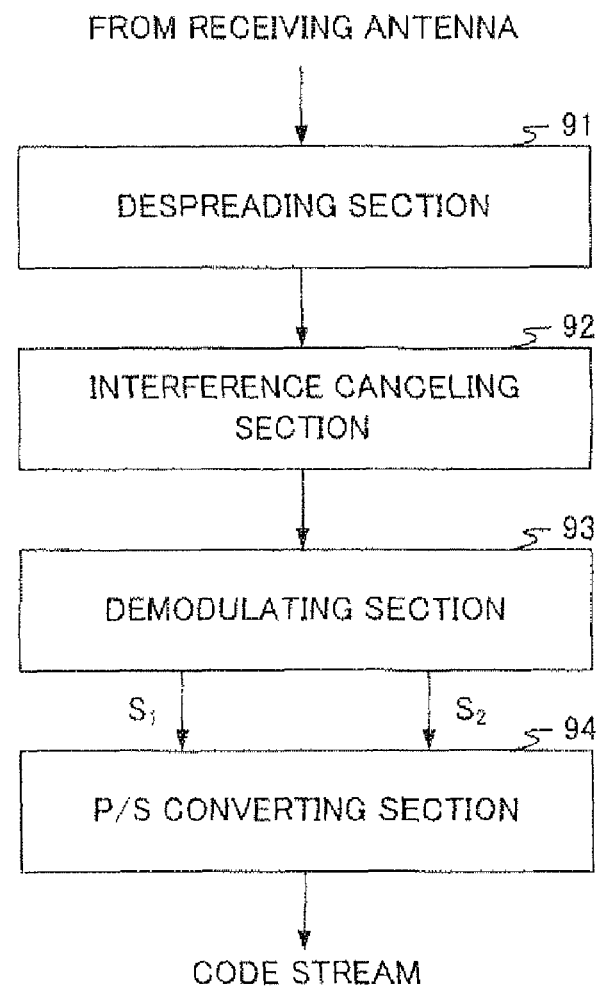
FIG. 2 is a block diagram showing a configuration of a conventional MPD reception system.

The main difference between a transmission system of the present invention and an MPD system is processing performed on both spread outputs. To be more specific, in FIG. 1, STTD spreading is delayed by one chip and then superimposed with direct spreading of S/P conversion, and transmission sequences of two paths are obtained. These steps are referred to as "MPD spreading." Here, the information of three chips is included in every two chips of MPD. Further, due to the delay influence, there are inter-symbol interference and interference between users in the output after spreading and interference canceling. Also, the outputted code matrix does not have orthogonality.

Conversely, in the present invention, orthogonal transforming section 17 converts the odd-number-th chips of the spread signal to negative values and exchanges the order of the odd numbers and even numbers. Then, in the present invention, combining section 18 adds the two spread outputs and respectively transmits the results through two antennas. These steps are referred to as "STTD spreading." As a result, the matrix configured per chip of $s_{2n-1}$ and $s_{2n}$ still has an orthogonal structure. Then, there is no inter-symbol interference or interference between users in the despread signal, and the signal has STTD orthogonal characteristics without canceling interference.

The orthogonal characteristics play a significant role in the complexity of detection on the receiving side and in performance of a system diversity gain. An STTD orthogonal structure makes it possible for the system to obtain a maximum diversity gain. Further, the system realizes maximum likelihood reception by simple matrix linear transformation upon detection on the receiving side.

In the present invention, codes are transmitted through two antennas, so that the transmission system of the present invention has spatial diversity capability. The system enables transmission of the content of two codes at the same time in one code period, so that it is possible to realize multiple access and improve transmission efficiency.

Figure 4:
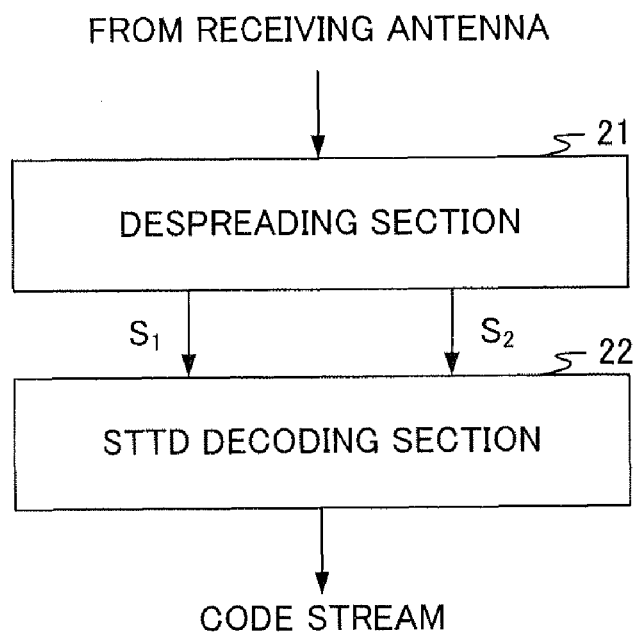
FIG. 4 is a block diagram showing a reception system according to an embodiment of the present invention.

FIG. 4 is a block diagram showing a reception system of the present invention. Despreading section 21 despreads the signal received through receiving antennas, that is, despreading section 21 utilizes the despread matrix (9) shown below and multiplies the matrix from the right by a row vector comprised of chip streams of one code of the received signal, and outputs a first code stream and a second code stream.

[9]

$$\begin{bmatrix} c_1 & c_2 & \ldots & c_N \\ c_2 & -c_1 & \ldots & -c_{N-1} \end{bmatrix}^T \quad \text{(Equation 9)}$$

Then, STTD decoding section 22 directly performs decoding using the detection algorithm of STTD. That is, STTD decoding section 22 obtains the conjugation of the second code stream, configures the first code stream and row vector and then multiplies the row vector from the right by the STTD channel matrix. In this way, the transmitted code stream is obtained.

A method of realizing despreading section 21 and STTD decoding section 22 in a flat fading environment will be described. Here, the reception system has one antenna, and $h_1$ and $h_2$ are the channel fading from the first and second transmitting antennas to the receiving antenna, respectively.

<1. Method of Realizing Despreading Section 21>

Signal r received at the 2m−1-th (m=1, 2, ..., N/2) chip in the n-th code period is expressed by following equation 10. Here, n(nN+2m−1) is the noise signal received in the code period and has a zero average value, and the noise distributions on the chips are independent of each other.

[10]

$$r(nN + 2m - 1) = [\, h_1 \ h_2 \,] \begin{bmatrix} -s_{2n}^* c_{2m} + s_{2n-1} c_{2m-1} \\ s_{2n-1}^* c_{2m} + s_{2n} c_{2m-1} \end{bmatrix} + n(nN + 2m - 1) \quad \text{(Equation 10)}$$

Signal r received at the 2m-th (m=1, 2, ..., N/2) chip is expressed by following equation 11.

[11]

$$r(nN + 2m) = [\, h_1 \ h_2 \,] \begin{bmatrix} s_{2n}^* c_{2m-1} + s_{2n-1} c_{2m} \\ -s_{2n-1}^* c_{2m-1} + s_{2n} c_{2m} \end{bmatrix} + n(nN + 2m) \quad \text{(Equation 11)}$$

When a received signal including no noise of these two chips configures a single row vector, the signal can be expressed by following equation 12.

[12]

$$[\, r'(nN + 2m - 1) \ r'(nN + 2m) \,] = [\, h_1 \ h_2 \,] \quad \text{(Equation 12)}$$

$$\begin{bmatrix} -s_{2n}^* c_{2m} + s_{2n-1} c_{2m-1} & -s_{2n}^* c_{2m} + s_{2n-1} c_{2m-1} \\ s_{2n-1}^* c_{2m} + s_{2n} c_{2m-1} & -s_{2n-1}^* c_{2m-1} + s_{2n} c_{2m} \end{bmatrix} =$$

$$[\, h_1 \ h_2 \,] \begin{bmatrix} s_{2n-1} & -s_{2n}^* \\ s_{2n} & s_{2n-1}^* \end{bmatrix} \begin{bmatrix} c_{2m-1} & c_{2m} \\ c_{2m} & -c_{2m-1} \end{bmatrix}$$

In this way, when the signal received at all chips in the n-th code period configures single row vector r(n), the equation changes to following equation 13. Here, $n_r(n)$ is a noise signal received at each chip in the code period.

[13]

$$r(n) = [\, r(nN + 1) \ r(nN + 2) \ \ldots \ r(nN + N) \,] \quad \text{(Equation 13)}$$

$$= [\, h_1 \ h_2 \,] \begin{bmatrix} s_{2n-1} & -s_{2n}^* \\ s_{2n} & s_{2n-1}^* \end{bmatrix}$$

$$\begin{bmatrix} c_1 & c_2 & \ldots & c_N \\ c_2 & -c_1 & \ldots & -c_{N-1} \end{bmatrix} + n_r(n)$$

Vectors r(n) are despread by utilizing the two row vectors of the rightmost matrix of above equation 13, and two output codes $x_1(n)$ and $x_2(n)$ are obtained. These two output codes, channel fading and the transmission code have the relationship expressed by following equation 14.

[14]

$$x(n) = [\, x_1(n) \ x_2(n) \,] \quad \text{(Equation 14)}$$

$$= [\, h_1 \ h_2 \,] \begin{bmatrix} s_{2n-1} & -s_{2n}^* \\ s_{2n} & s_{2n-1}^* \end{bmatrix} + n_x(n)$$

In a synchronous multi-user system, there is no interference caused by other users for x(n).

<2. Method for Realizing STTD Decoding Section 22>

When $x_1(n)$ and $x_2(n)$ configure vector $x(n)=[x_1(n) \ x_2^*(n)]$, x(n) can be expressed by following equation 15.

[15]

$$\breve{x}(n) = [\, s_{2n-1} \ s_{2n} \,] \begin{bmatrix} h_1 & h_2^* \\ h_2 & -h_1^* \end{bmatrix} + n_x(n) \quad \text{(Equation 15)}$$

By using the STTD channel matrix (16) shown below and multiplying the matrix from the right by x(n), maximum likelihood estimation $\hat{s}(n)$ of $[s_{2n-1} \ s_{2n}]$ expressed by following equation 17 is obtained.

[16]

$$\begin{bmatrix} h_1 & h_2^* \\ h_2 & -h_1^* \end{bmatrix}^H \quad \text{(Equation 16)}$$

[17]

$$\hat{s}(n) = [s_{2n-1} \ s_{2n}] + n_{s'}(n) \quad \text{(Equation 17)}$$

As a result, the code stream is obtained.

In this way, according to the present invention, it is possible to obtain the solution of the content of codes transmitted in one code period on conditions that there is one receiving antenna. The difference between the reception system of the present invention and an MPD system is that the reception system of the present invention does not require interference canceller processing. For a flat fading synchronous multi-user system, the present invention eliminates inter-symbol interference and interference between users in the input to the STTD decoding section. By eliminating the complex interference canceller processing, the complexity of the configuration of the reception system of the present invention is lower than that of the MPD system.

Figure 5:
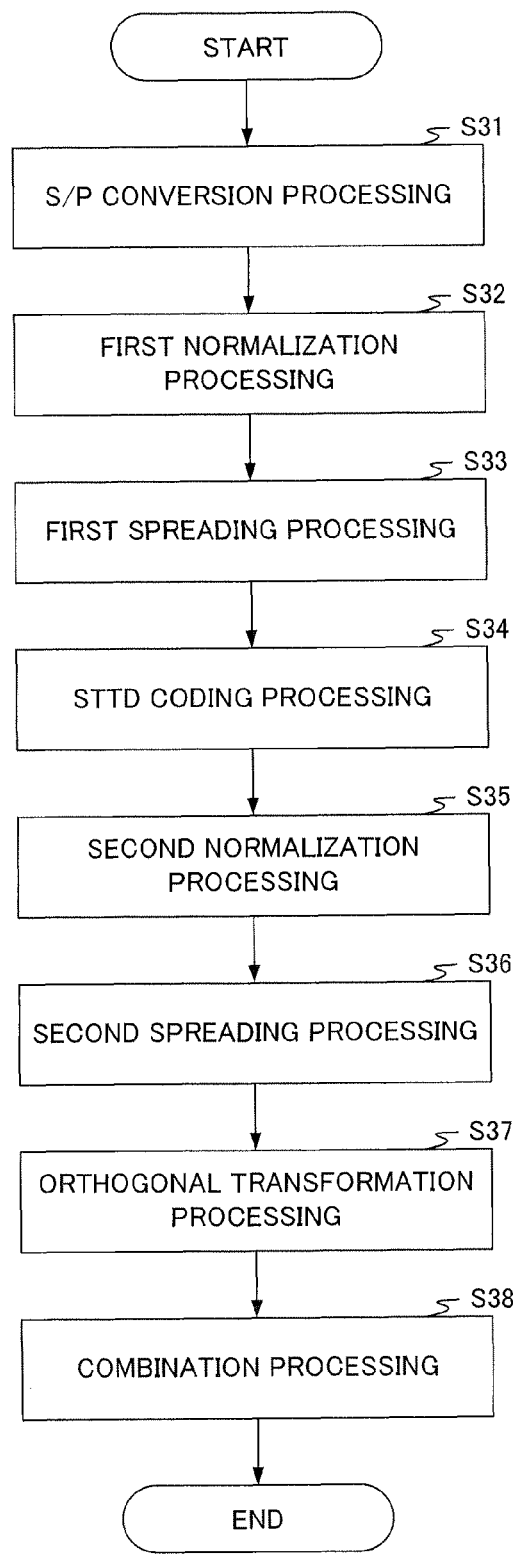
FIG. 5 is a flowchart of a transmission method according to an embodiment of the present invention.

FIG. 5 is a flowchart of a transmission method according to an embodiment of the present invention.

First, in step S31, the inputted code stream is S/P converted. Subsequently, the S/P converted code stream is converted into the two code streams of first code stream $s_1$ and second code stream $s_2$.

Next, on the one hand, in step S32, normalization processing is performed on first code stream $s_1$ and second code stream $s_2$ so that the power of the code to be transmitted is maintained at 1. In step S33, spreading processing is performed on the normalized code streams using a specific spread code. As a result, the first and second spread sequences of a first path are obtained.

On the other hand, in step S34, STTD coding is performed on first code stream $s_1$ and second code stream $s_2$, and coded code streams $-s_2^*$ and $s_1^*$ are outputted and subjected to normalization processing in step S35, such as, for example, multiplication by constant $1/\sqrt{2}$. Then, in step S36, the code streams normalized using the same spread code are subjected to spreading processing, and the first and second spread sequences of a second path are outputted. In step S37, orthogonal transformation is performed on the first and second spread sequences of the second path. That is, by converting the odd-number-th chips to negative values and exchanging the order of the odd-number-th and even-number-th chips, the first and second spread sequences of the second path after orthogonal transformation are obtained. Finally, in step S38, the above first and second spread sequences of the first path are respectively combined with the first and second spread sequences of the second path after orthogonal transformation. The combined sequences are transmitted from the transmitting antennas.

Figure 6:
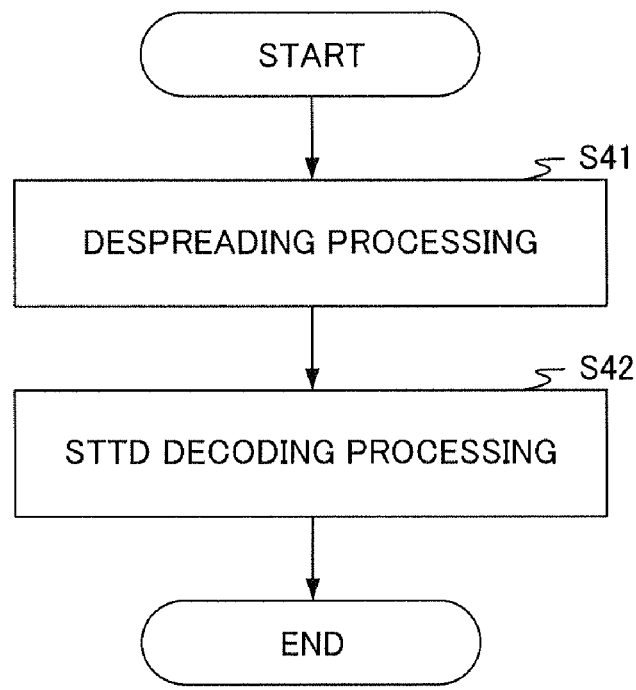
FIG. 6 is a flowchart of a reception method according to an embodiment of the present invention.

FIG. 6 is a flowchart of a reception method according to an embodiment of the present invention.

As shown in FIG. 6, in step S41, the signal received through a receiving antenna is despread, and a first code stream and a second code stream are outputted. Then, in step S42, decoding based on the detection algorithm of STTD is directly performed, and the transmitted code streams are obtained.

Figure 7:
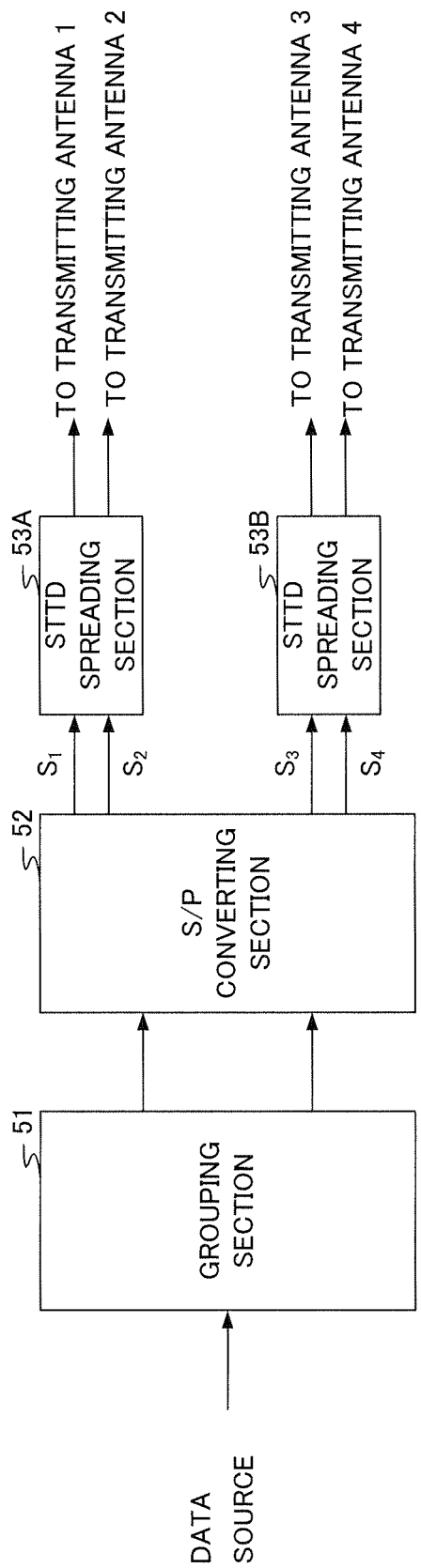
FIG. 7 is a block diagram showing another transmission system that uses three or more transmitting antennas according to an embodiment of the present invention.

Although a case has been described with above description where two transmitting antennas are employed, the present invention may employ three or more transmitting antennas. FIG. 7 is a block diagram showing a transmission system that employs three or more transmitting antennas.

As shown in FIG. 7, for example, when the data of two user terminals is transmitted from a plurality of transmitting antennas 1 to 4, grouping section 51 needs to group the antennas and the code stream inputted from a data source. To be more specific, the inputted code stream is divided into a code stream of a first user terminal and a code stream of a second user terminal, and grouping is performed so that each of two transmitting antennas is grouped as a group. However, if the code streams from the data source are code streams from the user terminals, the code streams do not need to be grouped, and antennas may be selected for the code streams of the user terminals.

Next, code streams are converted to first code stream $s_1$ and second code stream $s_2$ used for the first user terminal, and third code stream $s_3$ and fourth code stream $s_4$ used for the second user terminal in S/P converting section 52. Here, first code stream $s_1$ and second code stream $s_2$ are inputted to STTD spreading section 53A and spread. Third code stream $s_3$ and fourth code stream $s_4$ are inputted to STTD spreading section 53B and spread. STTD spreading sections 53A and 53B have the same configuration as STTD spreading section 19 shown in FIG. 3, and descriptions thereof will be omitted here.

However, in order to guarantee the performance of spatial diversity, it is preferable to group two transmitting antennas separated by distance as one group upon grouping transmitting antennas. This is for, by sufficiently utilizing the characteristics of spatial diversity of a MIMO system, guaranteeing at a maximum that occurrences of deep fading are shifted when the two transmitting antennas that transmit the same code are different.

Theoretically, the optimum standard for realizing combinations of transmitting antennas depends on the statistical characteristics of antenna channel fading. A method of grouping antennas is performed by obtaining the correlation of antenna channel fading of each of two antennas in a given period and selecting the lowest correlation.

In order to increase the transmission rate, different signals are transmitted through the transmitting antennas of different groups. Further, in order to guarantee that sufficient information can be acquired in the reception system and that the content transmitted through transmitting antennas can be estimated, the number of receiving antennas needs to be larger than the number of antenna groups. Further, when there is only one receiving antenna, different spread codes should be selected for the transmitting antennas of different groups. Furthermore, in order to guarantee immediate communication for a larger number of users, the system should adjust the signal transmission rate for the user according to the specific condition.

Even when a system has a plurality of receiving antennas, although the received signal should first be despread and then the solution of transmission codes should be obtained using the detection algorithm of a two-transmission multi-reception STTD system, a description thereof will be omitted here.

For a multi-user MIMO system, interference between users is invited, and therefore another user is not allowed to use the row vector of the rightmost matrix of above equation 13 as a spread code. This decreases the number of spread codes available for different users. However, in a CDMA system, in order to guarantee communication quality, the number of allowable users is quite smaller than the spread gain, and there are redundant spread codes in the system, so that it is rational to limit selection of the spread codes by other users. For example, when a given user performs speech communication at a rate of 9600 bps, the bandwidth of the CDMA channel is 1,228,800 Hz, and the processing gain is 1,228,800 Hz/9600=128=21 dB. According to this analogy, every time the number of users doubles, the processing gain of the channel decreases by 3 dB. Further, when the number of users reaches 32, the SNR approaches the minimum limit value for guaranteeing communication quality. Further, based on the number of users of simultaneous communication and the transmission rate required by each user, the transmission method and rate of each user may be compromised.

Figure 8:
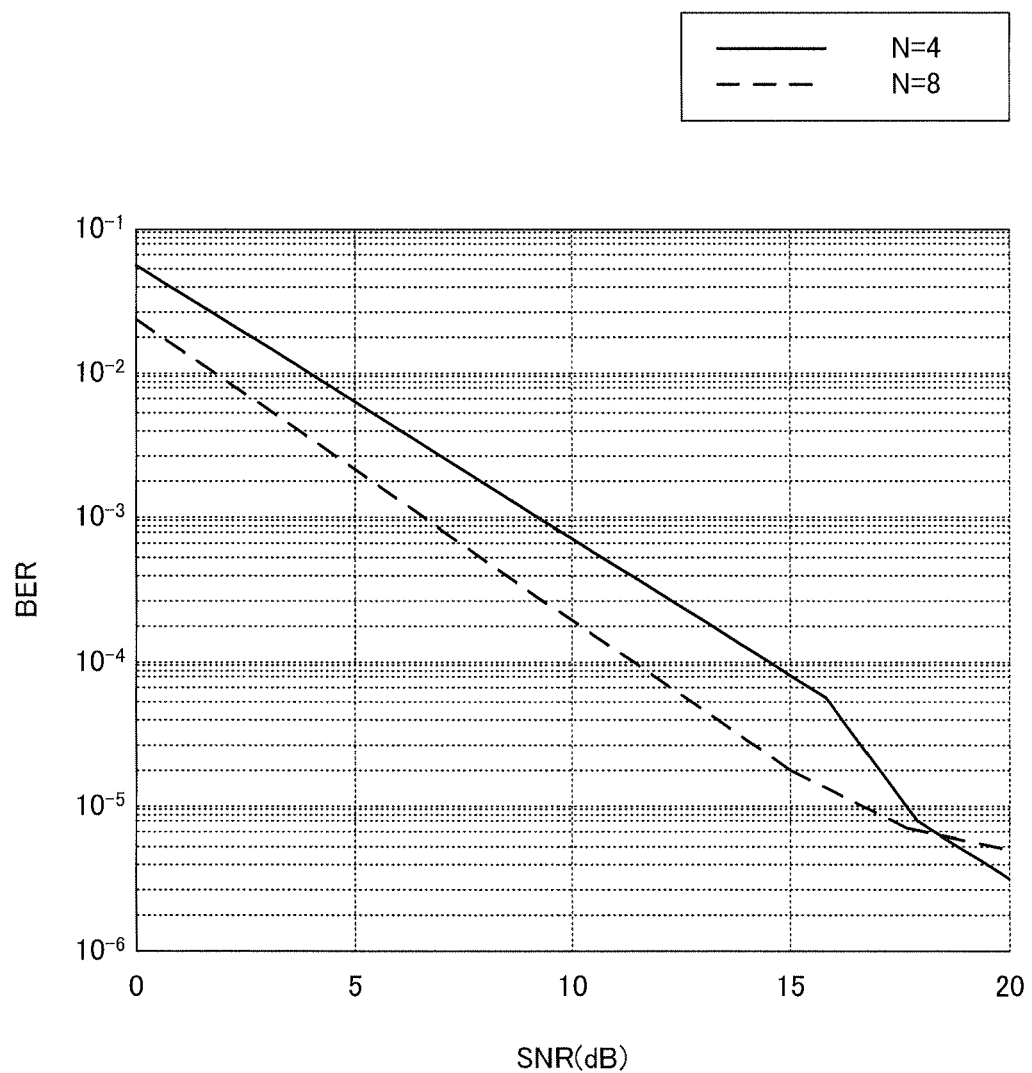
FIG. 8 shows the detection performance of a system of the present invention on the condition of different spread gains.
Figure 9:
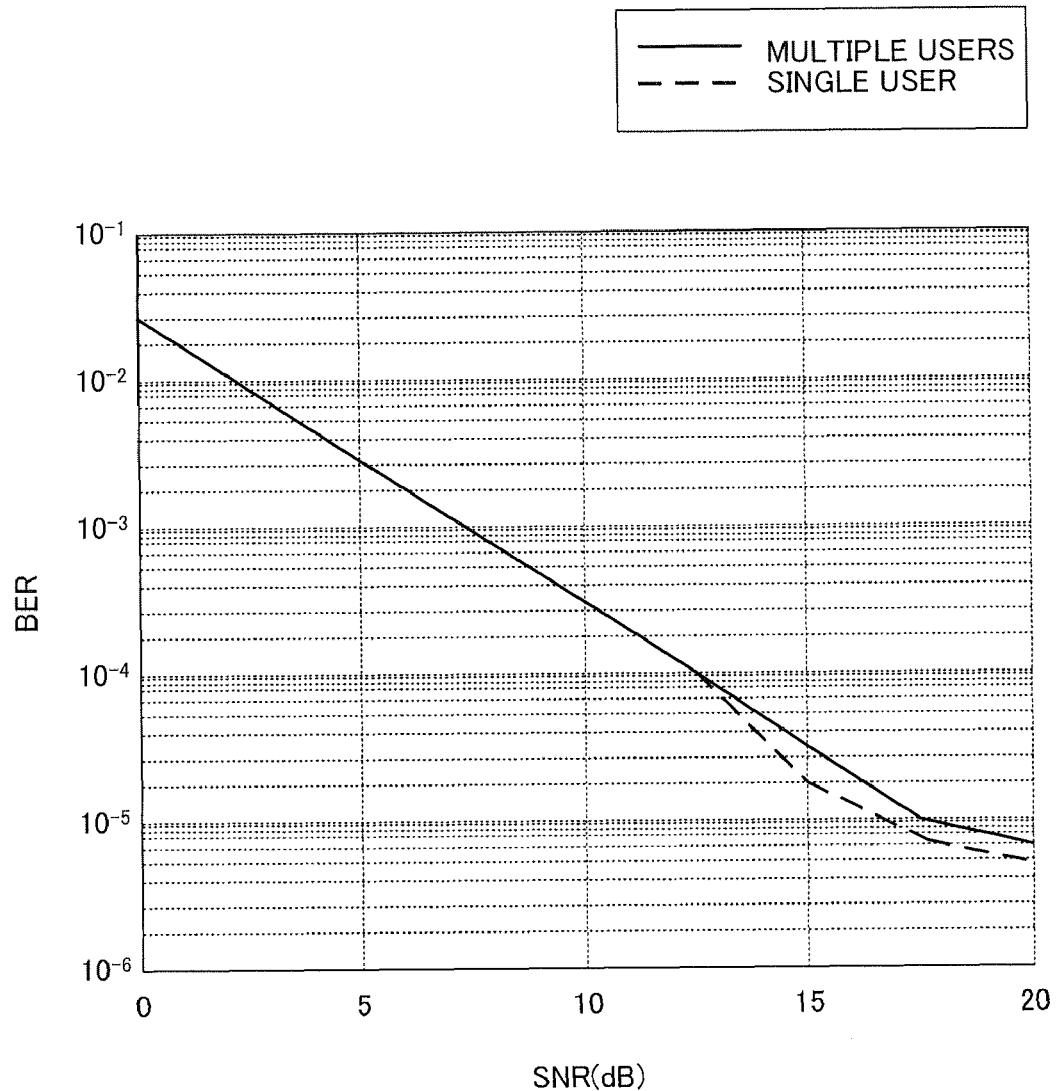
FIG. 9 shows the detection performance of a system of the present invention on the condition of different numbers of users.

FIG. 8 and FIG. 9 show the results of Monte Carlo simulation of a transmission system of the present invention, where the test is conducted 300,000 times. The noise is Gaussian white noise with average zero value, and the energy is variable. Further, a MIMO system generally has two transmitting antennas and one receiving antenna, and the channel fading from transmitting antennas to the receiving antenna is independent.

FIG. 8 shows the curves at which the bit error rate changes according to an SNR when there is a single user and the spread gains are four and eight. As is understood from FIG. 8, when the spread gain doubles, the system performance of an STTD spreading system increases by 2 to 3 dB.

FIG. 9 shows the curves at which the bit error rate changes according to an SNR when the spread gain is eight and the number of users is one and two, respectively. The multi-user system is a synchronous multi-user system.

The present invention realizes multiple access and spatial diversity by utilizing the spread signal of a CDMA system when the number of receiving antennas is not increased, and improves the code transmission rate of the system.

The above descriptions are only examples of an embodiment of the present invention. The scope of the protection of the present invention is not limited to this, and modifications or substitutions that one of skill in the art can easily achieve within the technical scope disclosed in the present invention shall remain within the scope of protection of the present invention. Thus, the scope of protection of the present invention shall be based on the scope of protection of the claims.

The invention claimed is:

1. A transmission system comprising:
   a serial-to-parallel converting section that serial-to-parallel converts an inputted code stream and outputs a first code stream and a second code stream;
   a first spreading section that spreads the first code stream and the second code stream using a specific spread code, and outputs first and second spread sequences of a first path;
   a space-time transmit diversity coding section that performs space-time transmit diversity coding on the first code stream and the second code stream, and outputs the coded first code stream and second code stream;
   a second spreading section that spreads the first code stream and second code stream coded by using the specific spread code, and outputs first and second sequences of a second path;
   an orthogonal transforming section that converts odd-number-th chips of the first and second spread sequences of the second path to negative values, exchanges the order of the odd-number-th and even-number-th chips and outputs the orthogonally transformed first and second spread sequences; and
   a combining section that adds the first and second spread sequences of the first path to the orthogonally transformed first and second spread sequences, respectively, and transmits the addition results through antennas.

2. The transmission system according to claim 1, comprising:
   a first normalizing section that is provided between the serial-to-parallel converting section and the first spreading section and performs normalization processing on the first code stream and the second code stream; and
   a second normalizing section that is provided between the space-time transmit diversity coding section and the second spreading section and performs normalization processing on the space-time transmit diversity coded first code stream and second code stream.

3. The transmission system according to claim 1, further comprising a grouping section that groups two transmitting antennas as one group and uses the group for a corresponding user terminal,
   wherein the serial-to-parallel converting section, the first spreading section, the space-time transmit diversity coding section, the second spreading section, the orthogonal transforming section and the combining section perform processing on code streams of user terminals.

4. The transmission system according to claim 3, wherein the grouping section divides a code stream from a data source into the code streams of the user terminals.

5. The transmission system according to claim 3, wherein the grouping section groups two transmitting antennas separated by distance as one group.

6. A reception system comprising:
   a despreading section that despreads a signal which is transmitted from the transmission system according to claim 1 and inputted from a receiving antenna, and outputs a first code stream and a second code stream; and
   a space-time transmit diversity decoding section that performs space-time transmit diversity decoding on the first code stream and second code stream, and outputs the decoded code streams.

7. The reception system according to claim 6, wherein the despreading section despreads the first code stream and the second code stream by utilizing a corresponding despread matrix and multiplying the corresponding despread matrix by a chip vector in a received code.

8. The reception system according to claim 6, wherein the space-time transmit diversity decoding section decodes the first code stream and the second code stream by multiplying the vector which is a combination of codes in received code streams by a channel matrix.

9. A transmission method comprising the steps of:
   serial-to-parallel converting an inputted code stream and outputting a first code stream and a second code stream;
   spreading the first code stream and the second code stream using a specific spread code, and outputting first and second spread sequences of a first path;
   performing space-time transmit diversity coding on the first code stream and the second code stream, and outputting the coded first code stream and second code stream;
   spreading the first code stream and second code stream coded by using the specific spread code, and outputting first and second spread sequences of a second path;
   converting odd-number-th chips of the first and second spread sequences of the second path to negative values, exchanging the order of the odd-number-th and even-number-th chips and outputting the orthogonally transformed first and second spread sequences; and
   adding the first and second spread sequences of the first path to the orthogonally transformed first and second spread sequences of the second path, respectively, and transmitting the addition results from antennas.

10. The transmission method according to claim 9, further comprising the steps of:
    normalizing the first code stream and the second code stream; and
    normalizing the space-time transmit diversity coded first code stream and second code stream.

11. The transmission method according to claim 9, wherein two transmitting antennas are grouped as one group and used for a corresponding user terminal, and the steps are performed on code streams of user terminals.

12. The transmission method according to claim 11, wherein a code stream from a data source is divided into the code streams of the user terminals.

13. The transmission method according to claim 11, wherein two transmitting antennas separated by distance are grouped as one group.

14. A reception method comprising the steps of:
despreading a signal which is transmitted by the transmission method according to claim 9 and inputted through a receiving antenna, and outputting a first code stream and a second code stream; and
performing space-time transmit diversity decoding on the first code stream and second code stream, and outputting the decoded code streams.

15. The reception method according to claim 14, wherein the first code stream and the second code stream are despread by utilizing a corresponding despread matrix and multiplying the corresponding despread matrix by a chip vector in a received code.

16. The reception method according to claim 14, wherein space-time transmit diversity decoding is performed on the first code stream and the second code stream by multiplying a vector which is the combination of codes in received code streams by a channel matrix.

* * * * *